T. Bingham,
Animal Trap.
No. 85,634. Patented Jan. 5. 1869.
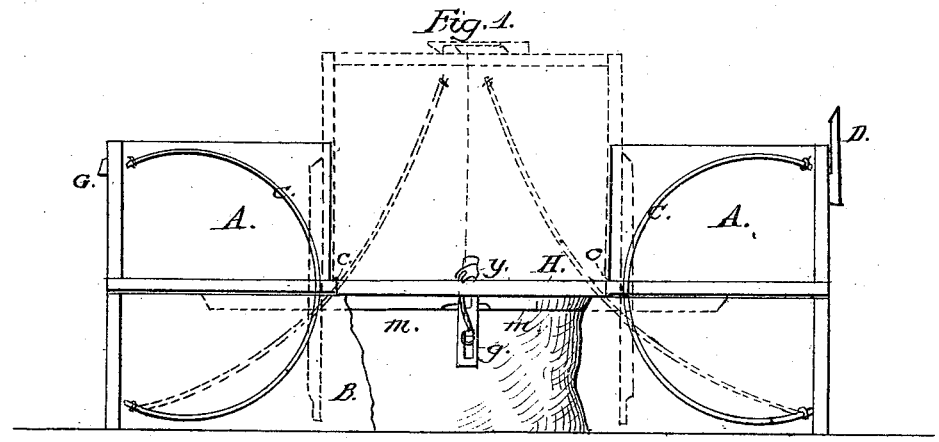
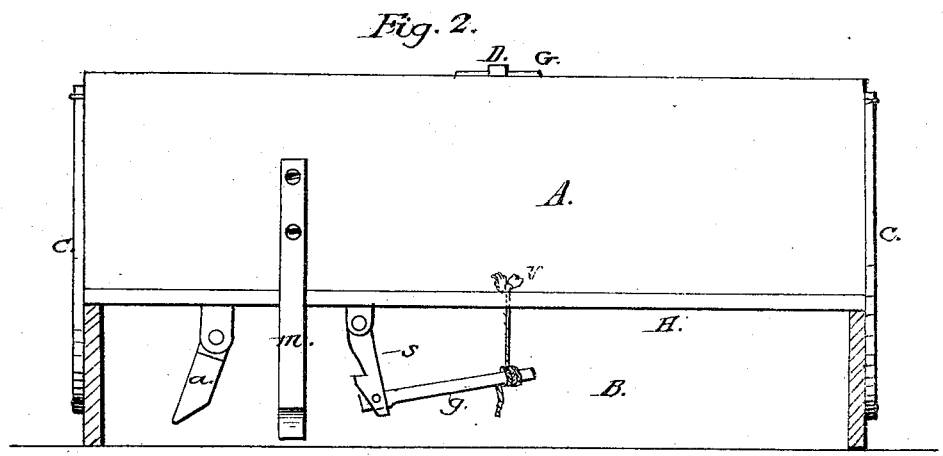
Witnesses:
S. N. Jones
O. V. Flora
Inventor:
Thomas Bingham
By A. Monnett & Bro.
Attorneys.

THOMAS BINGHAM, OF STOCKPORT, OHIO.

Letters Patent No. 85,634, dated January 5, 1869.

IMPROVED ANIMAL-TRAP.

The Schedule referred to in these Letters Patent and making part of the same.

*To all whom it may concern:*

Be it known that I, THOMAS BINGHAM, of Stockport, in the county of Morgan, and State of Ohio, have invented new and useful Improvements in Folding-Box Traps; and I do hereby declare that the following is a full, clear, and exact description thereof, which will enable those skilled in the art to make and use the same, reference being had to the accompanying drawings, forming part of this specification.

This invention relates to that class of traps by which birds and small animals may be caught alive; and The improvements consist in the arrangements for closing the trap by springs attached to folding covers.

The entire trap is constructed in a cheap, simple, and efficient manner, as will be shown.

Figure 1 is an end elevation, showing the trap set.

Figure 2 is a side elevation, showing the trap closed.

Similar letters of reference indicate corresponding parts.

A A are folding covers, hinged to the bottom, H, at c c, and closing when the trap is sprung, to form a tight box, as seen in fig. 1, (red lines.)

B is the base or frame on which the trap rests, said frame being broken away in the figures, to show the springing-mechanism.

C C are springs, four in number, two at either end of the trap, one end of each being attached to the cover, and the other to the base, B.

*g* is the trigger;

*s*, the catch; and

*a*, the flier.

To the trigger is fastened a string, which passes upward through the bottom of the trap, and has the bait *y* secured firmly to its upper end.

D is a catch, and

G, a wipe, attached to the folding covers, which engage and hold the trap shut when it is sprung.

Operation.

The trap is set by pressing down the covers A A until they are horizontal.

The bars *m m*, which are screwed to the outsides of the covers, as shown in the drawings, will now be horizontal, and meet under the bottom of the trap.

Bring the flier *a* over them, and engage it with the trap-catch *s*, and the trap is set.

A slight pull upward on the bait *y* serves to release the catch from the flier, when the springs C C, in their efforts to straighten, close the trap suddenly.

The catch D and wipe G engage, and thus keep it firmly closed.

Having thus described my invention,

What I claim as new, and desire to secure by Letters Patent, is—

A folding-box trap, composed of the hinged covers A A, base B, springs C C, bars *m m*, catch *s*, flier *a*, and trigger *g*, or their mechanical equivalents, when combined and arranged substantially in the manner and for the purposes as set forth.

Witness my hand, this 6th day of July, 1868.

THOS. BINGHAM.

Witnesses:
  J. A. WILLEY,
  HENRY CONNETT, Jr.